(12) United States Patent
Yonekura

(10) Patent No.: US 6,393,954 B2
(45) Date of Patent: *May 28, 2002

(54) WORK-CUTTING DEVICE

(75) Inventor: Toshihiro Yonekura, Inuyama (JP)

(73) Assignee: Murata Kikai Kabushiki Kaisha, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,331

(22) Filed: Mar. 13, 2000

(30) Foreign Application Priority Data

Mar. 12, 1999 (JP) .............................. 11-65982

(51) Int. Cl.$^7$ .............................. B26D 5/16; B26D 5/08
(52) U.S. Cl. ...................... 83/76.9; 83/76.6; 83/699.51; 83/601; 83/602; 83/530
(58) Field of Search .......................... 83/597, 646, 647, 83/647.5, 76.8, 76.9, 699.31, 699.41, 699.51, 699.61, 13, 601, 588, 555, 76.6, 602, 530

(56) References Cited

U.S. PATENT DOCUMENTS 3,756,110 A * 9/1973 Von Arx .................. 83/699.31
3,791,248 A * 2/1974 Pearson .................... 83/699.41
3,942,400 A * 3/1976 Roch .............................. 83/13
4,739,490 A * 4/1988 Hayashi et al. .............. 83/76.8
5,568,754 A * 10/1996 Chun ............................. 83/13
5,706,711 A * 1/1998 Ito ............................. 83/76.9
5,852,964 A * 12/1998 Sahashi .................... 83/699.61
5,967,014 A * 10/1999 Hayashi et al. .......... 83/699.51
5,970,839 A * 10/1999 Sahashi .................... 83/699.51

FOREIGN PATENT DOCUMENTS

JP         11-10437         1/1999

* cited by examiner

*Primary Examiner*—Boyer Ashley
*Assistant Examiner*—Thomas J. Druan, Jr.
(74) *Attorney, Agent, or Firm*—Armstrong, Westerman & Hattori, LLP

(57) ABSTRACT

The present invention eases possible rubbing between an upper cutting edge and a work cutting surface of a work cutting apparatus during the elevation of the upper cutting edge to prevent the upper cutting edge from being worn in order to increase its lifetime. In a device for cutting a work by elevating and lowering a movable upper cutting edge 12 relative to a fixed lower cutting edge 13, an upper-cutting-edge, tight-contact avoidance device 10 is provided for widening the clearance between the upper cutting edge 12 and a work cutting surface. The device 10 is comprised of a clearance adjustment mechanism 22 for adjusting the clearance between the upper cutting edge 12 and the lower cutting edge 13, and control device 35 for regulating operation of the clearance adjustment mechanism 22.

2 Claims, 11 Drawing Sheets

FIG. 5
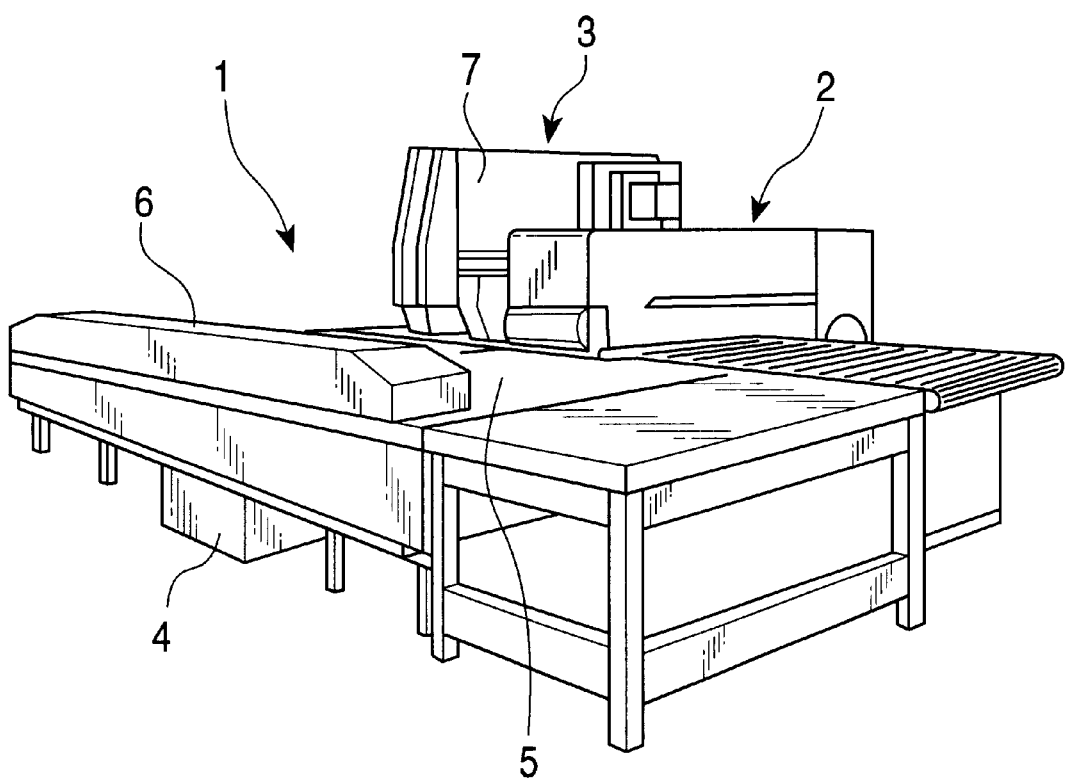
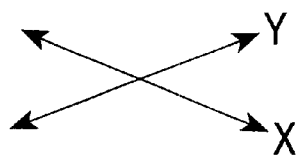

WORK-CUTTING DEVICE

FIELD OF THE INVENTION

The present invention relates to a work-cutting device, such as a right-angle shearing machine, for cutting a work, formed, for example, of sheet metal, using a fixed lower cutting edge and a movable upper cutting edge.

BACKGROUND OF THE INVENTION

A conventional work-cutting device is comprised of a right-angle shearing machine for using an L-shaped fixed lower cutting edge 42 and a movable upper cutting edge 41 extending along the inside of the lower cutting edge to cut a work W along a right angle direction P to obtain a rectangular piece Wb, as shown in FIG. 12.

In such a work-cutting device, the upper cutting edge 41 is subjected to a reaction force F from the work W which is applied upon cutting in a direction reverse to that of a cutting pressure, as shown in FIG. 14. A lateral load Fa, a horizontal component of the reaction force F, flexes the upper cutting edge 41 and its support system to cause the upper cutting edge 41 to escape in a lateral direction of the work-cutting device, thereby widening the clearance between the upper and lower cutting edges 41, 42. That is, during lowering, the upper cutting edge 41 follows an upper-cutting-edge locus b that is laterally offset from an inherent upper-cutting-edge locus a, which is shown by the chain line in FIG. 13. The amount of offset A between the loci a and b becomes maximum at a point of time during lowering when the cutting pressure is highest. A cut surface of the work W is located so as to correspond to the offset locus b.

Subsequently, once cutting has been finished, the lateral load Fa is eliminated to cancel the displacement of the upper cutting edge 41, which thus elevate whiles following the inherent upper-cutting-edge locus a. At this point, since the cut surface of the work W is offset along the locus b of the upper cutting edge 41 which has been actually followed during lowering, the upper cutting edge 41 elevates while rubbing the cut surface of the work W hard. This rubbing wears the upper cutting edge 41 to reduce its lifetime.

Although a work-cutting device for adjusting the clearance between the upper and lower cutting edges during work cutting has been proposed by the applicant (for example, Japanese Patent Application No. 9-172260 (Unexamined Japanese Patent Application Publication No. 11-10437)), it does not take into account the prevention of possible rubbing during the elevation of the upper cutting edge.

It is an object of the present invention to provide a work-cutting device that can ease possible rubbing between the upper cutting edge and the cut work surface during the elevation of the upper cutting edge to prevent the upper cutting edge from being worn in order to increase its lifetime and that can avoid a possible upward warp of the work to maintain the processing quality.

It is another object of the present invention to enable possible rubbing during the elevation of the upper cutting edge to be prevented using simple control.

It is yet another object of the present invention to enable possible rubbing during the elevation of the upper cutting edge to be prevented using a simple control even if the upper and lower cutting edges are L-shaped.

SUMMARY OF THE INVENTION

An embodiment of the present invention will be described with reference to FIG. 8, which corresponds to a preferred embodiment. This is a work-cutting device for elevating and lowering a movable upper cutting edge 12 relative to a fixed lower cutting edge 13, thereby cutting a work W, wherein the device has an upper-cutting-edge tight-contact avoidance means 10 for widening the clearance between the upper cutting edge 12 and a work cutting surface after work cutting has been finished.

According to this construction, after the completion of the work cutting, the upper-cutting-edge tight-contact avoidance means 10 widens the clearance between the upper cutting edge 12 and the work cutting surface, and the upper cutting edge 12 elevate with the clearance kept widened. Thus, even if the cutting surface is offset from the lower cutting edge 13 in a direction in which it leaves the lower cutting edge 13, due to the escape of the upper cutting edge 12 upon cutting, the upper cutting edge 12 is prevented from being forced against the cut work surface during the elevation of the upper cutting edge 12. Accordingly, the upper cutting edge 12 is prevented from being worn and thus has a long lifetime. In addition, a possible upward warp of the work W can be avoided to maintain the processing quality. To widen the clearance between the upper cutting edge 12 and the cut work surface after the completion of work cutting, the upper cutting edge may be moved so as to widen the clearance between the upper cutting edge 12 and the lower cutting edge 13, or the position of the work may be adjusted without the adjustment of clearance.

According to the present invention, the upper-cutting-edge tight-contact avoidance means 10 comprises a clearance adjustment mechanism 22 for adjusting the clearance between the upper cutting edge 12 and the lower cutting edge 13, an adjustment drive source 25 for driving this clearance adjustment mechanism 22, and a clearance control means 35 for allowing the clearance adjustment mechanism 35 to widen the clearance between the upper cutting edge 12 and the lower cutting edge 13 after the completion of work cutting and before the elevation of the upper cutting edge 12. The clearance adjustment mechanism 22 is comprised, for example, of an eccentric cam mechanism.

With this construction, simply by setting adjustment mechanism 22 for use in adjusting control means 35 using the clearance adjustment mechanism 22 for use in adjusting the clearance during cutting, as well as the adjustment drive mechanism 25, the clearance can be widened after the completion of work cutting and before the elevation of the upper cutting edge, and possible rubbing can be prevented during the elevation of the upper cutting edge, using a simple control.

According to the present invention, the lower cutting edge 13 may have a generally L-shaped planar shape, and the upper cutting edge 12 may have a generally L-shaped planar shape extending along the lower cutting edge 13. The clearance adjustment mechanism 22 adjusts the clearance in an oblique direction relative to the two sides of each of the lower cutting edge 13 and the upper cutting edge 12 which form the L shape.

A work-cutting device with the generally L-shaped upper cutting edge 12 and the lower cutting edge 13 is referred to as a "right-angle shearing machine" and is generally used for cutting the work W in its corner into a rectangular piece Wb. In such a work-cutting device, if the clearance adjustment mechanism 22 adjusts the clearance in the oblique direction as described above, the two sides of the upper cutting edge 12 which form an L shape can simultaneously be subjected to clearance adjustments, thereby preventing possible abrasion of the upper cutting edge associated with its elevation, using the simple construction.

According to the present invention, the clearance control means 35 may adjust the clearance depending on the thickness of the work W while the upper cutting edge 12 is lowered during work cutting, and may adjust the clearance, during the elevation of the upper cutting edge, to a value larger than that during lowering.

In addition to the present invention, the clearance adjustment mechanism 22 includes means 21 for moving the position of the upper cutting edge 12 in a horizontal direction and an adjustment drive source 25 for driving the means 21.

BRIEF DESCRIPTION OF THE DRAWINGS

FIG. 5 is a perspective sketch drawing of a work-processing device having the work-cutting device installed therein.

DETAILED DESCRIPTION OF THE PREFERRED EMBODIMENTS

One embodiment of the present invention will be described with reference to FIGS. 1 to 11.

Figure 6:
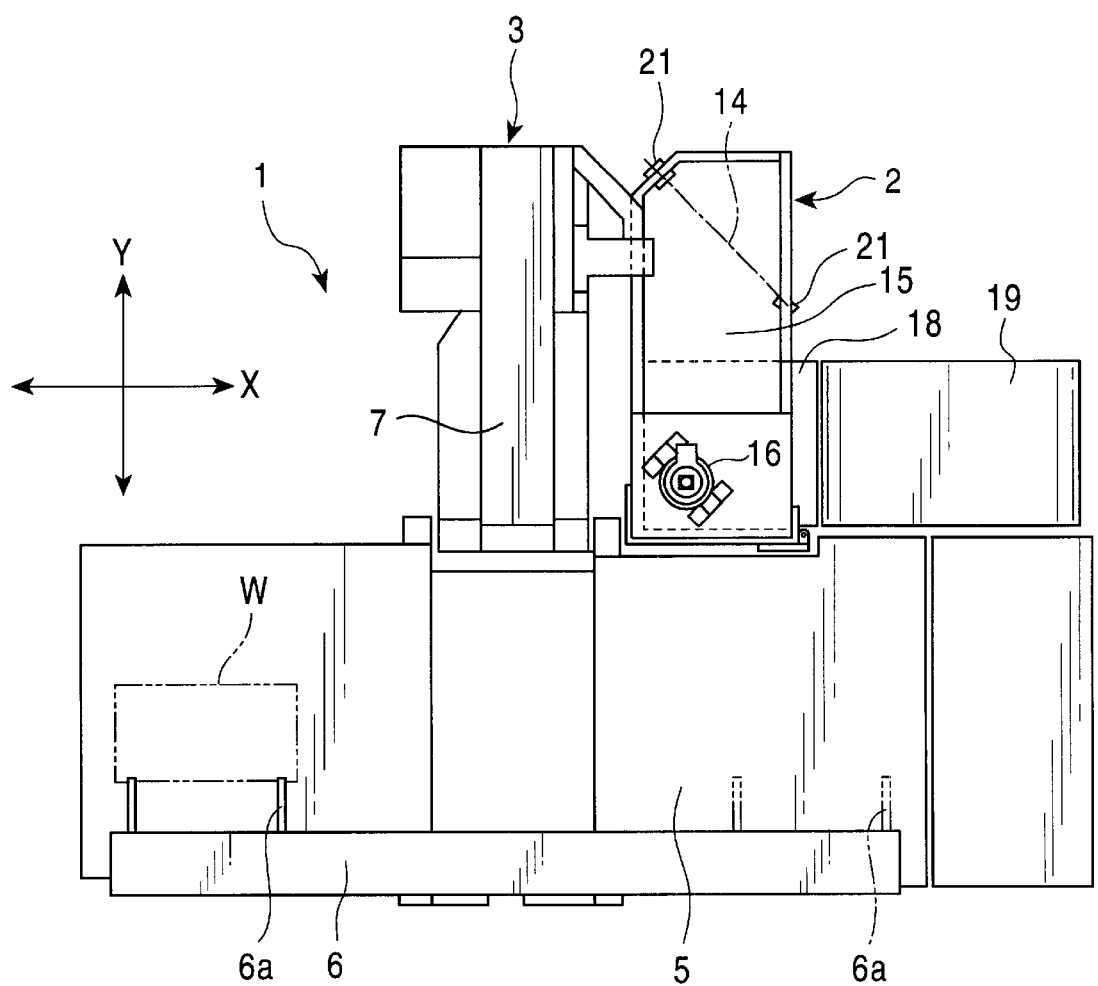
FIG. 6 is a top view of the work-processing device.
Figure 7:
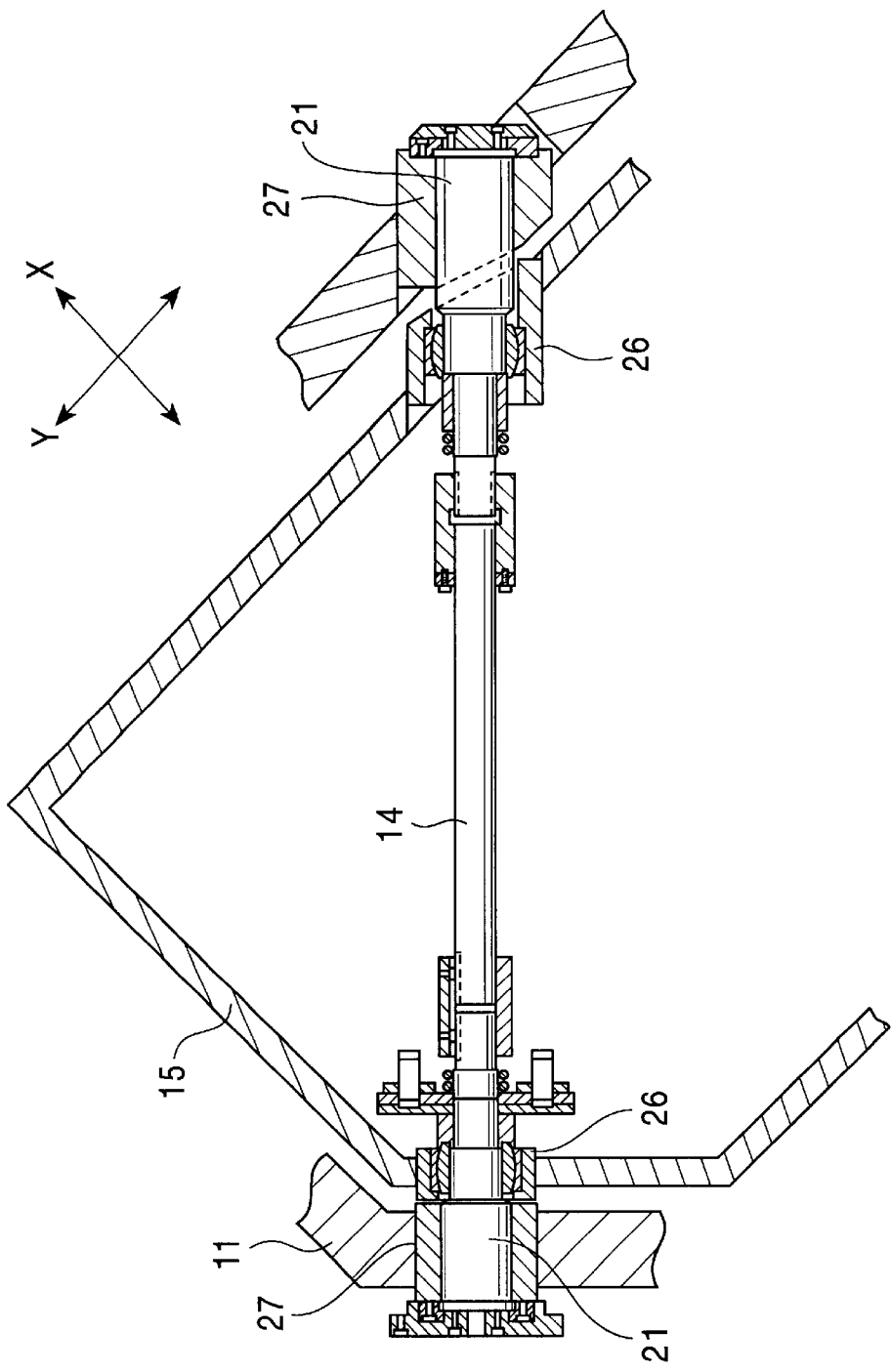
FIG. 7 is an enlarged horizontal sectional view showing a section of the work-cutting device having a swiveling support shaft installed therein.

FIGS. 6 and 7 are a perspective and top views of a work-processing device 1 having a work-cutting device installed therein and comprising a shearing machine according to the invention.

The work-processing device 1 comprises a composite machine having a turret punch press machine 3 installed adjacent to a work-cutting device 2, and a work table 5 and a work-feeding device 6 that are shared by the devices 2, 3. The work-feeding device 6 grips a work W on the work table 5 using a work holder 6a to move it in a lateral direction (X axis direction) and a longitudinal direction (Y axis direction). The work-feeding device 6 has shaft strokes that are appropriate in gripping the work W, while feeding it to either a cutting section of the work-cutting device 2 or a punching section of the punch press machine 3. A C-shaped punch frame 7 of the punch press machine 3 is installed behind a bed 4, and the frame 7 has an upper turret (not shown in the drawings) with a plurality of punch tools arranged therein and a punch drive mechanism (not shown in the drawings) for elevating driving the punch tools at a predetermined punch position.

Figure 1:
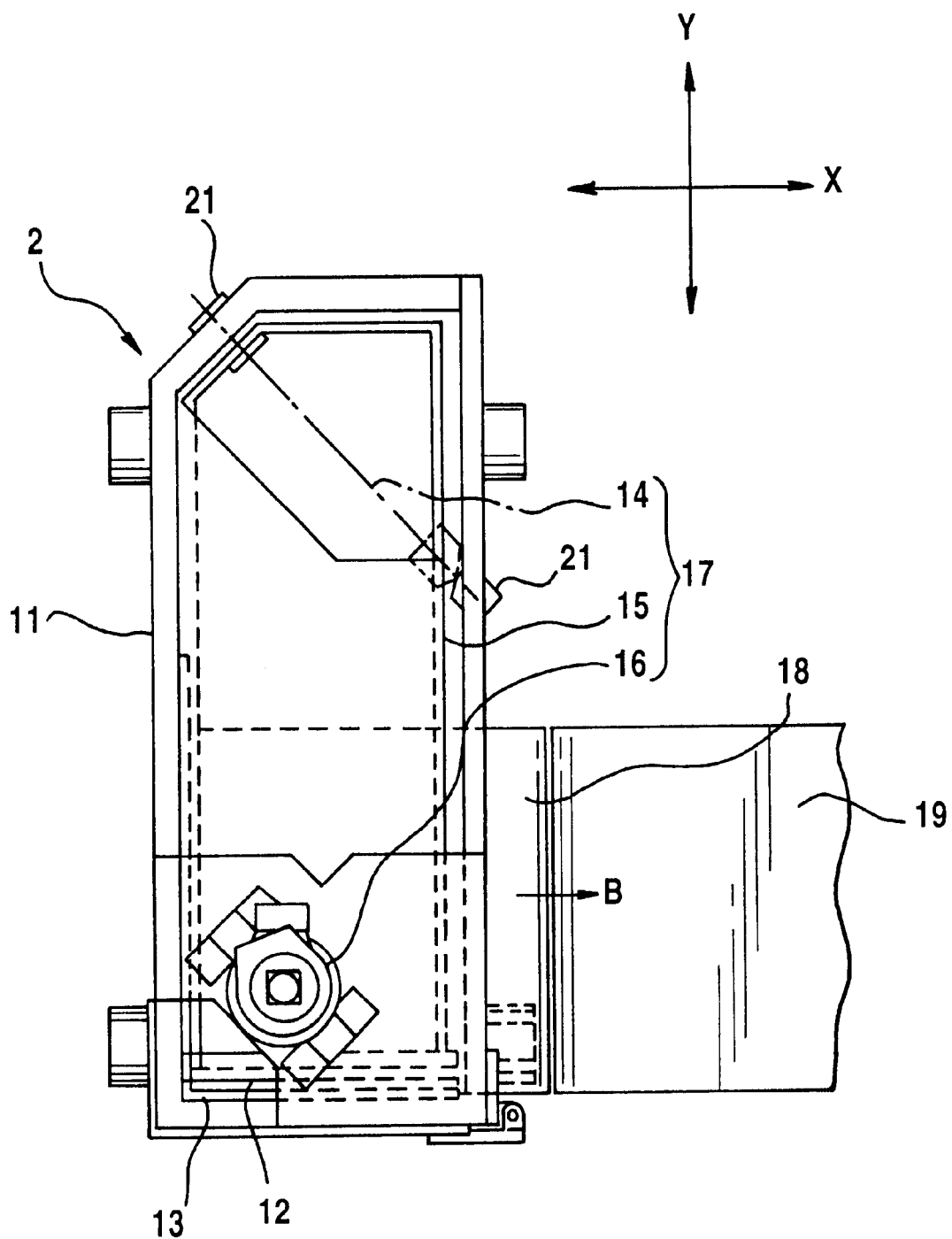
FIG. 1 is a partly omitted top view of a work-cutting device according to one embodiment of the present invention.
Figure 2:
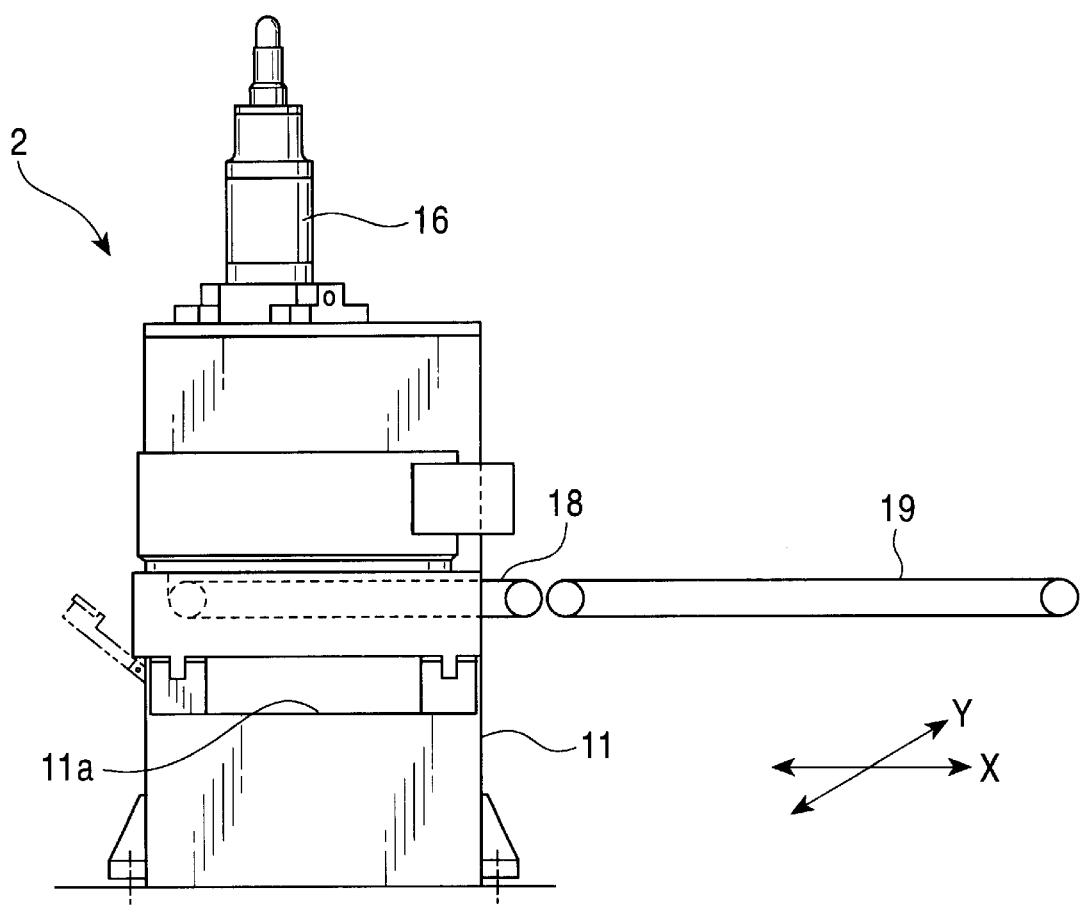
FIG. 2 is a front view of the work-cutting device.
Figure 3:
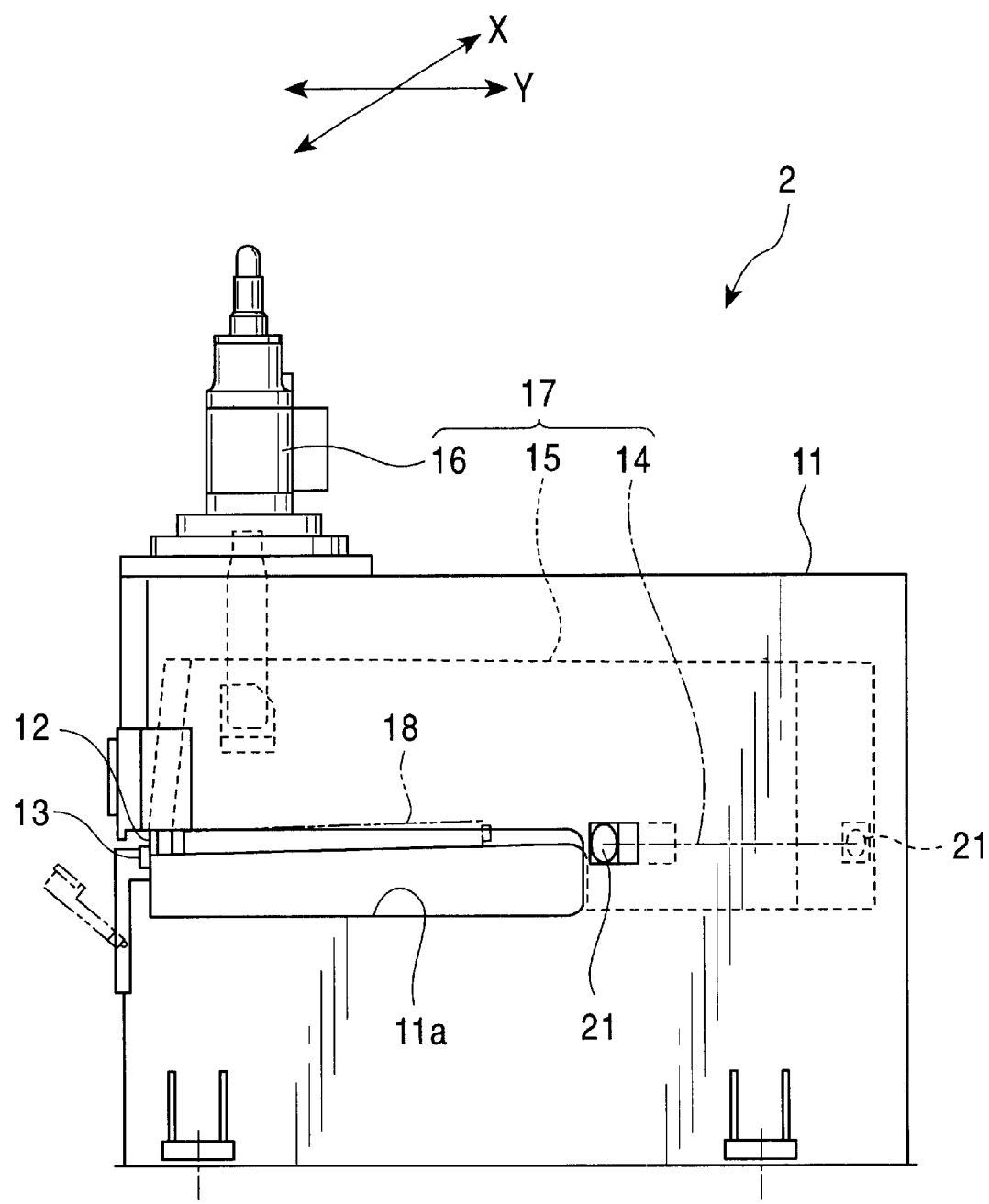
FIG. 3 is a right side view of the work-cutting device.
Figure 4:
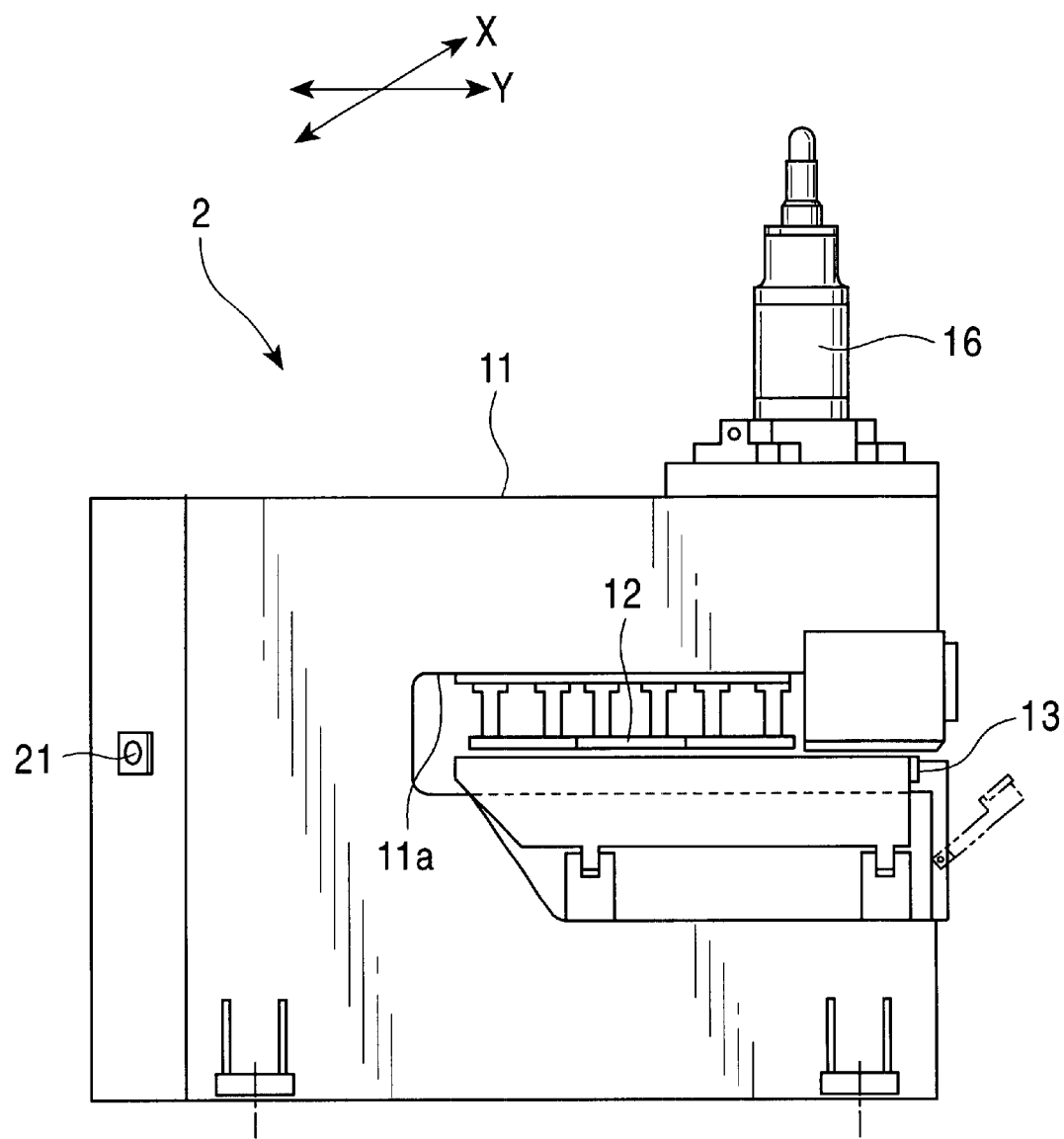
FIG. 4 is a left side view of the work-cutting device.

The work-cutting device 2 cuts the work W fed thereto by the work-feeding device 6 after punching by the punch press machine 3, and has an upper cutting edge 12, that is movable, and a lower cutting edge 13, that is fixed, which are vertically arranged in a frame 11 constituting a work-cutting device body, as shown in FIGS. 1 and 4 that are a top view, a front view, a right side view and a left side view, respectively. The frame 11 is shaped like a prism extending in a vertical direction and has a notch-shaped opening 11a formed so as to extend from its front surface to a neighborhood of the middle of its opposite side surfaces, thereby forming the C-shaped side surfaces of the frame 11. The lower cutting edge 13 has a planar shape that is bent in an L shape from the lateral direction (X axis direction) to the longitudinal direction (Y axis direction), and is located along an internal lower edge of the notch-shaped opening 11a in the frame 1J. The upper cutting edge 12 has an L-shaped planar shape extending along the inside of the lower cutting edge 13 and has a uniform inclination (a rake angle) extending from one end thereof through a bent section in the middle thereof to the other end thereof.

The upper cutting edge 12 is attached to a lower part of a tip of a ram 15 supported in a rear portion of the frame 11 via a swiveling support shaft 14 for vertical rotative movement. The frame 11 has a drive device 16 installed on its frontward top surface for moving the ram 15 in the vertical direction, and the drive device 16, the ram 15 and the swiveling support shaft 14 constitute an upper-cutting-edge drive mechanism 17 for allowing the upper cutting edge 12 to rotatively move in the vertical direction. When moved in the vertical direction based on driving by the drive mechanism 17, the upper cutting edge 12 meshes with the lower cutting edge 13 to shear and cut the work W. The swiveling support shaft 14 has its axis located above the lower cutting edge 13 and closer to its upper end.

In addition, the frame 11 has a conveyor 18 installed inside for ejecting a cut piece to the exterior of the machine along a transfer direction B parallel with the X axis direction, wherein the cut piece is a produce Wb cut from the work W by the upper cutting edge 12 and the lower cutting edge 13. A secondary conveyor 19 is located after the conveyor 18 for transferring the cut piece unloaded by the conveyor 18.

Figure 8:
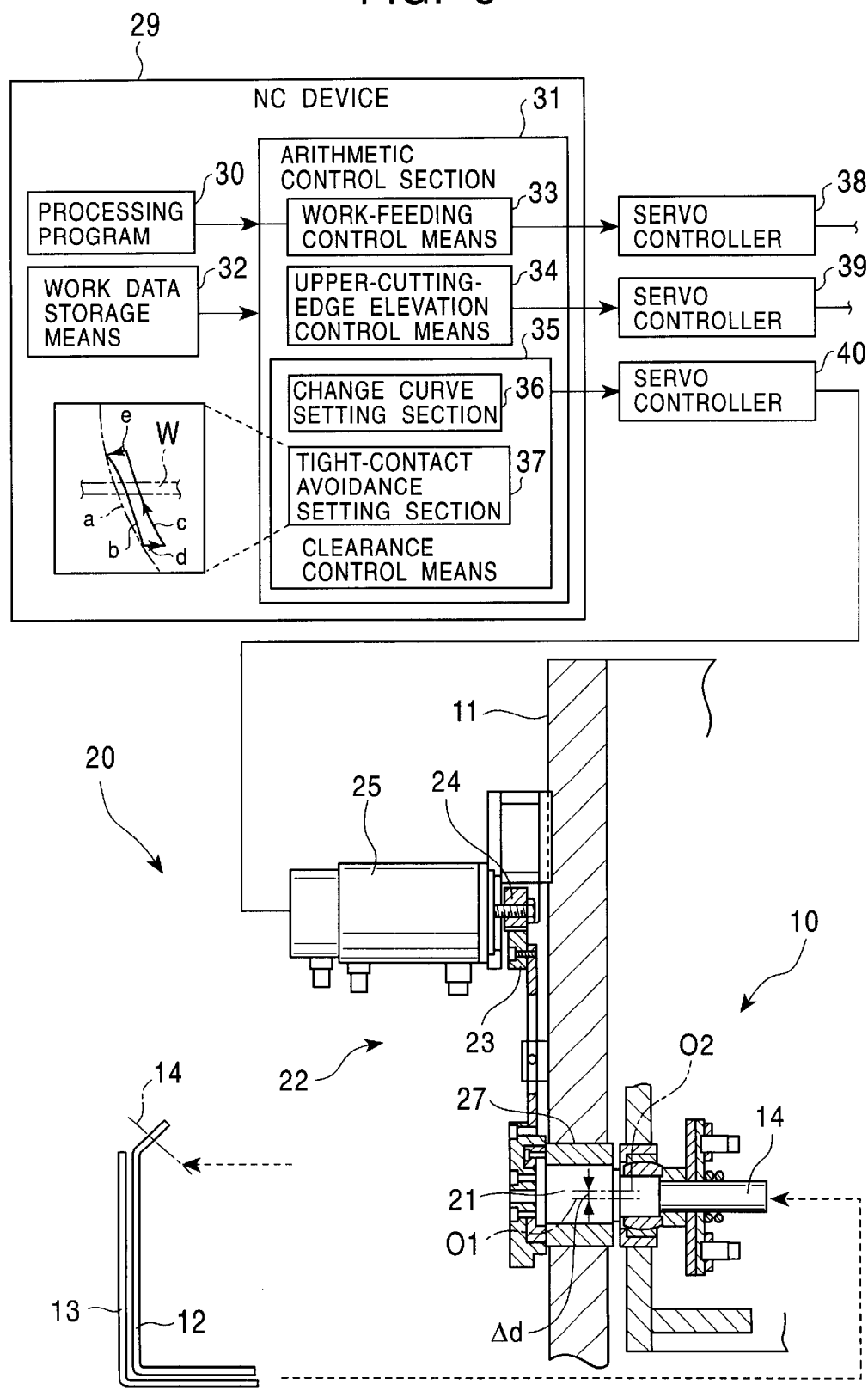
FIG. 8 is an explanatory drawing showing a combination of a contracted top view of upper and lower cutting edges of the work-cutting device, a sectional view of a clearance adjustment mechanism, and a block diagram of a control system for the clearance adjustment mechanism.
Figure 9:
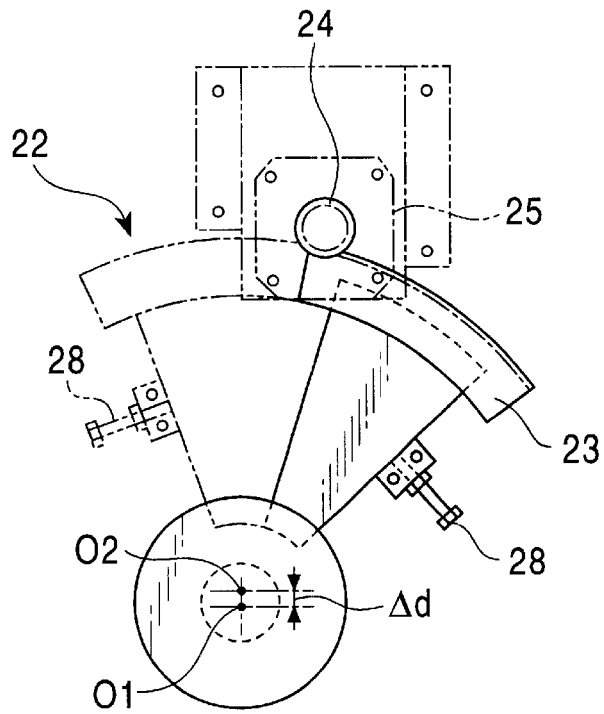
FIG. 9 is a side view showing part of the clearance adjustment mechanism.

The swiveling support shaft 14 has its axial direction set so to be oblique to either side of the L-shaped lower cutting edge 13, for example, to be biased from both the X and Y axis directions by 45 degrees, as shown in FIGS. 1 and 7 in top views. The ram 15 is rotatably supported by the swiveling support shaft 14 via bearings 26 at its opposite sides. Each bearing 26 is comprised of a spherical bearing. In addition, the swiveling support shaft 14 is eccentrically and integrally provided on a rotating shaft 21 rotatably supported by a seat 27 in its outer peripheral surface, as shown in FIG. 8 in a vertical sectional view. Specifically, the axis 02 of the swiveling support shaft 14 is biased upward from the axis 01 of the rotating shaft 21 by a very small amount Δd when the rotating shaft 21 is located at a referential rotative movement position. In addition, the horizontal clearance of the upper cutting edge 12 from the lower cutting edge 13 is set to be appropriate in cutting the work W of a predetermined board thickness when the rotating shaft 21 is located at the referential rotative movement position.

The rotating shaft 21 has a clearance adjustment mechanism 22 connected thereto. The clearance adjustment mechanism 22 is a means for adjusting the horizontal position of the upper cutting edge 12 relative to the lower cutting edge 13 by rotatively moving the rotating shaft 21 to slightly displace the axis of the swiveling support shaft 14 in a horizontal direction orthogonal with this axis. The clearance adjustment mechanism 22 comprises a sector gear 23 (see FIG. 9) fixed to the end of the rotating shaft 21 and a servo motor 25 having a pinion 24 fixed to an output shaft thereof so as to mesh with the sector gear 23. The servo motor 25 is installed on the frame 11. The servo motor 25 operates as an adjustment drive source for the clearance adjustment mechanism 22, and when it is driven, the rotating shaft 21 rotatively moves in a direction reverse to the rotating direction of the output shaft of the servo motor 25 by an amount equivalent to the amount of rotative movement of the output shaft. Since the swiveling support shaft 14 is located in a fashion being biased from both sides of the lower cutting edge 13 by 45 degrees, the above single adjustment operation simultaneously adjusts both the side of the upper cutting edge 12 extending along the X axis direction and the side thereof extending along the Y axis direction. The amount of adjustments made by the clearance adjustment mechanism 22 is limited by a pair of stoppers 28 provided in the frame 11 for abutment on the sector gear 23.

An NC device 29 is a control device for controlling the entire operation of the work-processing device 1 and has computer-based numeral control functions and functions unique to a programmable controller. The NC device 29 has an arithmetic control section 31 for analyzing and executing a processing program 30, and drives the servo motor 25, a drive source for the drive device 16 for the ram 15, and other drive sources for the work-processing device 1, via servo controllers 38 to 40 for each shaft, in response to instructions from the arithmetic control section 31.

The NC device 29 has a work-feeding control means 33 for feeding a work on each shaft and an upper-cutting-edge elevation control means 34 for controlling the drive source for the ram drive device 16, as well as a clearance control means 35 and a work data storage means 32. The work data storage means 32 has data relating to materials, that is, works, their board thickness, etc. set therein.

The clearance control means 35 is a means for controlling the clearance adjustment means 22 and provides instructions for the servo motor 25, its adjustment drive source, via the servo controller 40. The clearance control means 35 has a change curve setting section 36 for setting a change curve for the clearance between the upper cutting edge 12 and the lower cutting edge 13 for a lowering operation of the upper cutting edge 12, and a tight-contact avoidance setting section 37 for setting the amount of widening of the clearance between the upper cutting edge 12 and the lower cutting edge 13 for lowering of the upper cutting edge 12.

The clearance adjustment mechanism 22, the servo motor 25 that is an adjustment drive source, and the clearance control means 35 constitute an upper-cutting-edge tight-contact avoidance means 10 for widening the clearance between the upper cutting edge and the work cutting surface after the completion of work cutting. In addition, the NC device 29 and the clearance adjustment mechanism 22 constitute an adjustment means 20 for adjusting the relative positions of the work W and the upper cutting edge 12 in the direction of the clearance between the upper cutting edge 12 an the lower cutting edge 13 during cutting of the work W.

Operation of the above construction will be explained.

Figure 10:
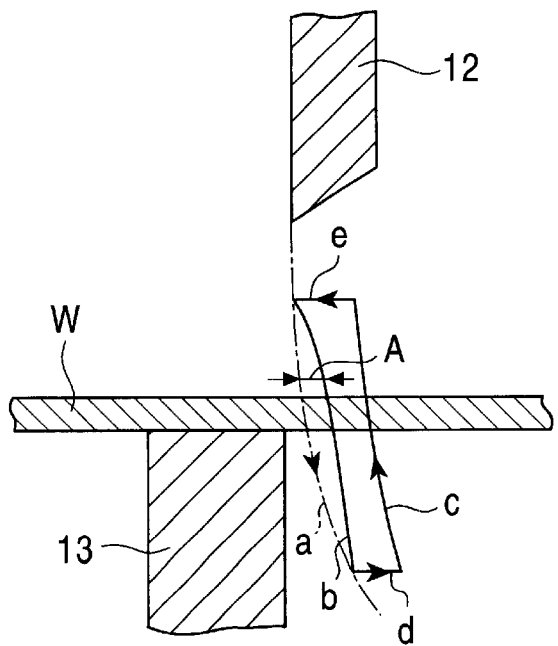
FIG. 10 is an explanatory drawing of an upper-cutting-edge locus adjusted by the clearance adjustment mechanism.
Figure 11:
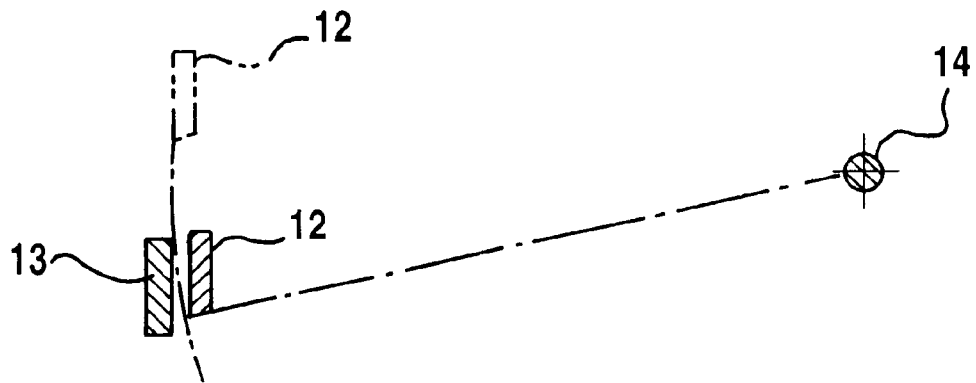
FIG. 11 is an explanatory drawing showing a cutting operation by the work-cutting device in a sectional view.
Figure 12:
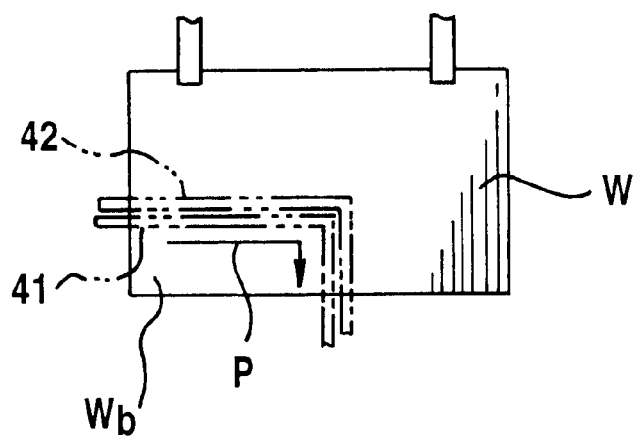
FIG. 12 is a top view showing a cutting process carried out by a conventional work-cutting device.
Figure 13:
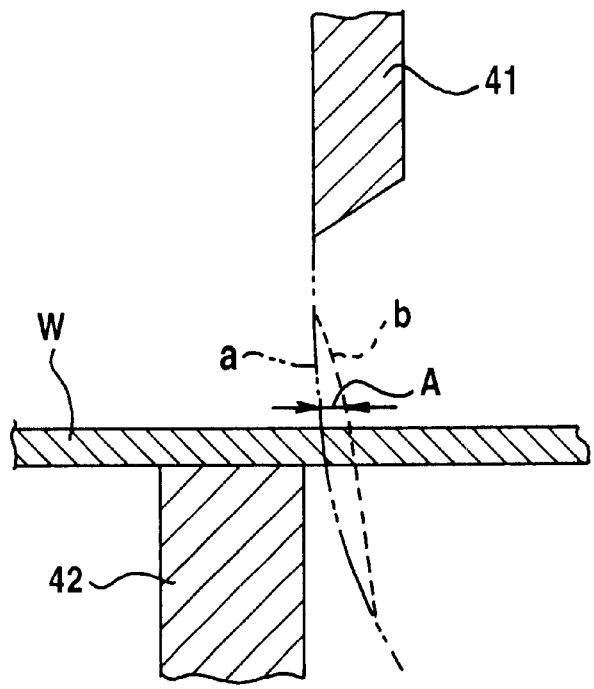
FIG. 13 is an explanatory drawing of a conventional upper-cutting-edge locus.
Figure 14:
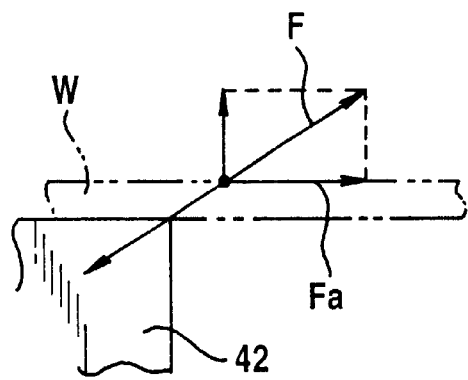
FIG. 14 is an explanatory drawing of a lateral load acting on the upper cutting edge.

In the work-cutting device 2, when lowered, the upper cutting edge 12 meshes with the lower cutting edge 13 to cut the work W. The upper cutting edge 12 is lowered by rotatively moving the ram 15 downward using the swiveling support shaft 14 as an oscillation center, as shown in FIG. 11. Since the upper cutting edge 12 is subjected to a lateral load during lowering, as described in the conventional example with FIG. 14, it follows an upper-cutting-edge locus b laterally offset from its inherent upper-cutting-edge locus a as shown in FIG. 10. The amount of offset A becomes maximum during lowering. After the completion of cutting, the lateral load associated with a cutting resistance is eliminated to cancel the displacement of the upper cutting edge 12, thereby zeroing the amount of offset A.

In this manner, once cutting has been completed by lowering the upper cutting edge 12, the clearance of the upper cutting edge 12 from the lower cutting edge 13 is widened as indicated by an upper-cutting-edge locus d, which is shown in FIG. 10. This widening operation is based on the operation performed by the clearance adjustment control means 35 for adjusting the clearance adjustment mechanism 22, the clearance is widened by an amount set in the tight-contact avoidance setting means 37. In this manner, once the clearance has been widened, the upper-cutting-edge elevation control means 34 elevates the upper cutting edge 12. Thus, the upper cutting edge 12 follows an upper-cutting-edge locus c as shown in FIG. 10.

In this manner, the upper cutting edge 12 elevates based on widening of the clearance. Thus, even if the cutting surface of the work W is offset from the lower cutting edge 13 in a direction in which it leaves the lower cutting edge 13, due to the escape of the upper cutting edge 12 upon cutting, the upper cutting edge 12 is avoided from being forced against the work cutting surface during elevation. Accordingly, the upper cutting edge 12 is prevented from being worn and has a long lifetime.

Once the upper cutting edge 12 has elevated to its elevation end, the clearance is narrowed by the amount by which it was widened during lowering, whereby the upper cutting edge 12 returns to an original upper standby state. That is, the upper cutting edge 12 returns by an amount equivalent to an upper-cutting-edge locus e, which is shown in FIG. 10.

According to this embodiment, when the upper cutting edge 12 is lowered to cut the work, the clearance adjustment mechanism 22 is driven according to control by the clearance control means 35 so as to adjust the clearance between the upper cutting edge 12 and the lower cutting edge 13. That is, the clearance is adjusted to be smaller as the upper cutting edge 12 lowers. This operation restrains widening of the clearance caused by the escape of the upper cutting edge 12 induced by a cutting load, thereby maintaining the linearity of a cutting line in the work W. The escape of the upper cutting edge 12 depends on the board thickness and material of the work W, so that the clearance control means 35 controls the clearance based on data on the board thickness and material stored in the work data storage means 32 in order to improve the linearity of the cutting line.

The operation of widening the clearance of the upper cutting edge 12 after the completion of cutting is also performed when the clearance during lowering has been adjusted, and the amount of clearance widening in this case depends on the amount by which the clearance during the cutting operation has been adjusted.

A principal object of the clearance adjustment mechanism 22 is to adjust the clearance during a cutting operation performed by lowering the upper cutting edge 12 to maintain the linearity of the work cutting line in order to improve the processing accuracy. However, by using this function of the clearance adjustment mechanism 22 to control the work-cutting device so that the clearance of the upper cutting edge 12 is widened after the completion of cutting, the upper cutting edge 12 can be restrained from being worn solely by adding a simple control function.

Although the above embodiment has been described in conjunction with the L-shaped upper and lower cutting edges 12, 13, the present invention is also applicable to an upper and a lower cutting edges shaped like straight lines. In addition, although the above embodiment has been explained in conjunction with the upper cutting edge 12 that is rotatively moved in the vertical direction around the swiveling support shaft 14 for cutting, the present invention is also applicable to an upper cutting edge 12 that is linearly elevated and lowered.

Since the work-cutting device according to the present invention has the upper-cutting-edge tight-contact avoidance means for widening the clearance between the upper cutting edge and the work cutting surface after the completion of work cutting, possible rubbing between the upper cutting edge and the work cutting surface during the elevation of the upper cutting edge can be eased to prevent the upper cutting edge from being worn in order to increase its lifetime. In addition, a possible upward warp of the work can be avoided to maintain the processing quality.

If the upper-cutting-edge tight-contact avoidance means comprises the clearance adjustment mechanism for adjusting the clearance between the upper cutting edge and the lower cutting edge, the adjustment drive source for driving this clearance adjustment mechanism, and the clearance control means for allowing the clearance adjustment mechanism to widen the clearance between the upper cutting edge and the work cutting surface after the completion of work cutting and before the elevation of the upper cutting edge, then possible rubbing can be prevented during the elevation of the upper cutting edge using simple control.

If the upper and lower cutting edges are generally L-shaped and the clearance adjustment mechanism adjusts the clearance in an oblique direction relative to two sides of each of the lower and upper cutting edges which form the L shape, then the two sides can simultaneously be subjected to clearance adjustments to enable the clearance widening operation to be performed after the completion of cutting and before the elevation using the simple construction and control.

What is claimed is:

1. In a work-cutting device including means for elevating and lowering a moveable upper cutting edge relative to a fixed lower cutting edge for cutting work, and means of varying the clearance between said upper cutting edge and said lower cutting edge, an upper cutting edge tight contact avoidance means for widening the clearance between the upper cutting edge and an edge of a cut work surface produced during cutting, said upper cutting edge tight contact avoidance means comprising:

a clearance adjustment mechanism operably engaging said upper cutting edge clearance varying means for varying clearance between the upper cutting edge and the produced cut work surface, an adjustment drive, including a servo motor, for controllably operating said clearance adjustment mechanism during movement of said upper cutting edge continuously from its elevated position to its cutting position and following cutting of said work, and a clearance control means connected to said adjustment drive to control operation of said servo motor, said clearance control means being programmed to vary the extent of clearance between the upper cutting edge and said edge of said cut work surface after completion of work cutting and during elevation of said upper cutting edge.

2. A work-cutting device as in claim 1 in which said lower cutting edge has a generally L-shaped planar shape, said upper cutting edge has a generally L-shaped planar shape extending along the lower cutting edge, and said clearance varying means adjusts the clearance between said upper and lower cutting edges in an oblique direction relative to two sides of each of the lower and upper cutting edges which form the L-shape.

* * * * *